(12) United States Patent
Wolf

(10) Patent No.: US 6,714,610 B1
(45) Date of Patent: Mar. 30, 2004

(54) METHOD OF TRANSMITTING CLOCK SIGNALS, METHOD OF SYNCHRONIZING CLOCK GENERATORS OR NETWORK ELEMENTS, AS WELL AS A NETWORK ELEMENT AND A CLOCK GENERATOR

(75) Inventor: Michael Wolf, Mundelsheim (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/404,319

(22) Filed: Sep. 24, 1999

(30) Foreign Application Priority Data

Oct. 5, 1998 (DE) .......................... 198 45 767

(51) Int. Cl.[7] .............................. H04L 7/00
(52) U.S. Cl. ...................... 375/356; 375/354
(58) Field of Search ....................... 375/354, 356, 375/271, 302, 362; 332/144; 327/141

(56) References Cited

U.S. PATENT DOCUMENTS 3,987,422 A * 10/1976 Yanagidaira et al. ....... 375/329
6,185,247 B1 * 2/2001 Williams et al. ............ 375/356
6,262,998 B1 * 7/2001 Hogeboom ................ 375/354
6,295,324 B1 * 9/2001 Whikehart ................. 375/308

OTHER PUBLICATIONS

Th. Klett, "Aspekte der Netazsynchronisation", Alcatel Telecom Rundchau, 1st Quarter 1997 (complete English translation of cited reference attached).

* cited by examiner

Primary Examiner—Phuong Phu
(74) Attorney, Agent, or Firm—Sughrue Mion, PLLC

(57) ABSTRACT

A method of transmitting clock signals (CS) in a synchronous digital communications network and a method of synchronizing clock generators (SSU) or network elements (SEC) wherein signaling of the clock quality is effected by phase-modulating the clock signal (CS). The clock signal (CS) is transmitted and received through simple clock interfaces (T4, CLO; T3, CLI) and contains a phase modulation characteristic of the clock quality. The phase modulation is detected and quality information is derived therefrom. Based on the quality information, the clock generator (SSU) or the network element (SEC) are synchronized to the clock signal. Also disclosed are a clock generator (SSU) and a network element (SEC; NE) for carrying out the two methods.

19 Claims, 2 Drawing Sheets

METHOD OF TRANSMITTING CLOCK SIGNALS, METHOD OF SYNCHRONIZING CLOCK GENERATORS OR NETWORK ELEMENTS, AS WELL AS A NETWORK ELEMENT AND A CLOCK GENERATOR

BACKGROUND OF THE INVENTION

This invention relates to a method of transmitting clock signals in a synchronous signal communications network to a method of synchronizing clock generators or network elements of a synchronous digital communications network to a network element of a synchronous digital communications network and to a clock generator for a synchronous digital communications network.

In an article by Th. Klett, "Aspekte der Netzsynchronisation", Alcatel Telecom Rundschau, 1st Quarter 1997, it is described that in a communications network based on the synchronous digital hierarchy (SDH) standard, the network elements have to be synchronized. According to the article, network nodes include dedicated clock generators which distribute a clock signal to all network elements of the node. The distribution is done either through clock interfaces, so-called 2-MHz interfaces, or through interfaces for 2-Mb links.

For synchronization, synchronization signals (clock signals) are transmitted between the network elements and between the network elements and the clock generator. Either 2-MHz signals are transmitted over dedicated synchronization links (clock interfaces) or use is made of message signals at a bit rate of multiples of 155 MHz, from which a clock signal is derived. Each network element receives synchronization signals from several neighboring network elements, and selects one of the synchronization signals as a reference clock signal based on a synchronization status message (SSM), which indicates the clock quality. In the case of 2-MHz links, however, it is not possible to transmit a synchronization status message. Therefore, 2-Mb links are preferred to the 2-MHz links for the transmission of the synchronization signals. This, however, requires much more complex and expensive interface devices.

SUMMARY OF THE INVENTION

It is an object of the invention to provide an alternative method of transmitting synchronization signals wherein quality information can be transmitted with the clock signal and which manages with simpler interface devices. Another object of the invention is to provide a method of synchronizing clock generators or network elements of a synchronous digital communications network wherein clock signals can be received through simple clock interfaces. Further objects of the invention are to provide a network element and a clock generator comprising a clock interface for receiving or transmitting clock signals which makes it possible to transmit quality information with the clock signal.

These objects are attained by a method of transmitting a clock signal serving to synchronize a network element of a synchronous digital communications network, the clock signal being received from a clock source via a clock interface of the network element, the method comprising the step of applying a phase modulation characteristic of the quality of the clock signal to the clock signal.

The invention is further directed to a method of synchronizing a clock generator or a network element wherein a clock signal is received via a clock interface, the method comprising the step of applying a phase modulation characteristic of the quality of the clock signal to the clock signal, detecting the phase modulation and deriving quality information therefrom, and based on the quality information, synchronizing the clock generator or the network element to the clock signal. According to a further aspect of the invention, two or more further clock signals are received which also have a phase modulation characteristic of their quality applied to them, and based on the quality of the two or more further clock signals, one of the clock signals is selected for synchronization.

The invention is further directed to a network element for a synchronous digital communications network, comprising a clock supply circuit for supplying the network element with an internal clock signal, a clock interface for receiving an external clock signal from a clock source, and means for synchronizing the clock supply circuit to the received external clock signal, the network element further comprising means for detecting a phase modulation applied to the external clock signal, said phase modulation being indicative of the quality of the external clock signal. According to a further aspect of the invention, the network element further comprises means for applying a phase modulation indicative of the quality of the internal clock signal to clock signals to be transmitted.

Finally, the invention is directed to a clock generator for distributing a clock signal to network elements of a synchronous digital communications network, comprising clock interfaces for connecting the network elements, and further comprising means for determining the clock quality and means for applying to the clock signal a phase modulation indicative of the quality of the clock signal.

Further aspects and advantages of the invention will be apparent from the detailed description and appended claims below.

Advantages of the invention are that it can be implemented by few, simple technical means, that the quality information is available together with the clock signal throughout the communications network, and that the method according to the invention can be used in both directions, from the clock generator to the network element and from the network element to the clock generator.

BRIEF DESCRIPTION OF THE DRAWINGS

The invention will become more apparent from the following description of several embodiments taken in conjunction with the accompanying drawings, in which.

DETAILED DESCRIPTION OF THE INVENTION

In synchronous digital communications networks, such as SDH networks or synchronous optical networks (SONETs), it is necessary for all network elements of the network to operate in synchronism within specified limits. To accomplish this, mutual synchronization is carried out, i.e., each network element selects one of the message signals received from neighboring network elements and derives a clock signal therefrom, or another clock signal of a further clock source, such as a primary reference clock generator, a GPS module, or a node clock generator (synchronization supply unit, SSU), as a reference clock signal for the synchronization of its internal clock supply. For the purpose of clock selection, a synchronization status message (SSM) is transmitted in the overhead of message signals. However, a synchronization status message can be transmitted only in message signals, not in clock signals, such as 2-MHz signals. The clock quality is the long-term frequency and phase stability of clock signals, e.g., the day drift. So far, the synchronization status messages given in Table 1 have been defined:

TABLE 1

Synchronization status messages

| Quality | Stability requirement | Use |
|---|---|---|
| G.811 | 10E-11 Long-term frequency departure | Primary reference clock generator (PRC) |
| G.812T | 5*10E-10 Offset 10E-9 Day drift | Transit node (SSU-transit) |
| G.812L | 10E-8 Offset 2*10E-8 Day drift | Local node (SSU-local) |
| G.813 | 5*10E-8 Offset 5*10E-7 Day drift | Synchronous Equipment clock (SEC) |
| DNU | Do not use (for synchronization) | |
| Unknown | Quality unknown | |

Network elements for synchronous digital communications networks are, for example add/drop multiplexers, line multiplexers, and crossconnects.

A basic idea of the invention is to apply to clock signals a phase modulation that is characteristic of the clock quality. This makes it possible to transmit information on the clock quality through clock interfaces, which per se are designed only for periodic pulse sequences of square or sinusoidal shape.

Figure 1:
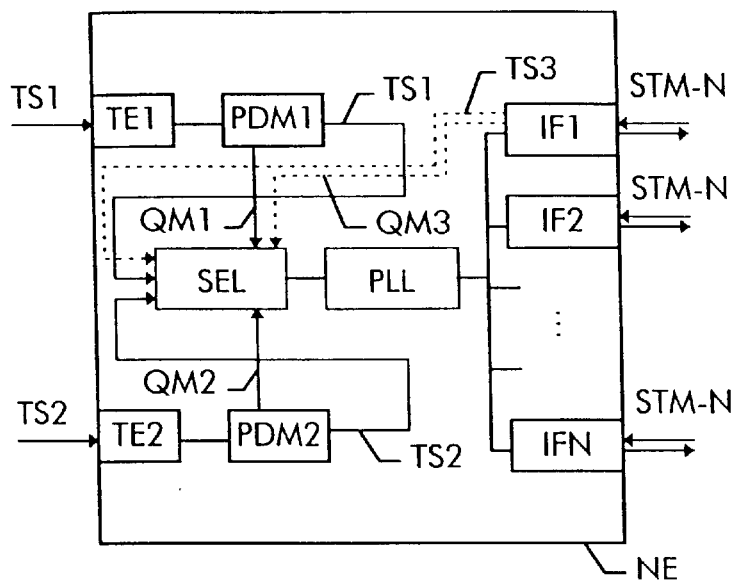
FIG. 1 shows a network element of a first embodiment.

The network element NE of the first embodiment shown in FIG. 1 receives two clock signals TS1 and TS2 at clock inputs TE1 and TE2, respectively. Each of the clock inputs is followed by a phase demodulator PDM1, PDM2 which detects the phase modulation contained in the respective clock signal TS1, TS2 and derives quality features QM1, QM2 therefrom. The pattern of the phase modulation is characteristic of the quality of the clock signal to which the phase modulation was applied. The two clock signals TS1, TS2 as well as the quality features QM1, QM2 of the two clock signals are passed to a selection logic SEL. Based on the quality features, the selection logic SEL selects one of the two clock signals for synchronization. The selected clock signal is fed to an internal clock supply circuit PLL. The clock supply circuit PLL is thus synchronized to the selected clock signal. The internal clock supply circuit can be implemented, for example, with a digital phase-locked loop incorporating a tunable oscillator. It serves to supply the network element with an internal clock signal that is used to generate message signals to be transmitted, and in the event of a synchronization failure keeps the internal clock supply stable for a few seconds, so that no disturbances will occur in the synchronous communications network. The message signals to be transmitted are generated in interface units IF1–IFN, which are connected, for example by optical fiber waveguides, to the neighboring network elements of the network, and via which the network elements of the network exchange message signals STM-N.

The clock inputs of the network element are conventional electrical clock interfaces for 2-MHz signals according to ITU-T G.703 that are connected to clock sources via coaxial cables, for example. Such clock interfaces serve exclusively to synchronize the network element and to supply the latter with clock signals, and can receive only periodic pulse sequences, not message signals. Advantageously, the phase demodulators extract the phase modulation from the clock signals received via the clock interfaces by low-pass filtering.

In addition, further clock signals TS3 may be derived from received message signals in one or more of the interface units IF1–IFN using timing recovery circuits, and fed to the selection logic. By analyzing the synchronization status messages SSM contained in the received message signals, quality features QM3 can be determined, which are then taken into account by the selection logic in the selection of a reference clock source. This is indicated in FIG. 1 by dashed arrows for the third clock signal TS3 from the interface IF1 to the selection logic SEL.

Figure 2A:
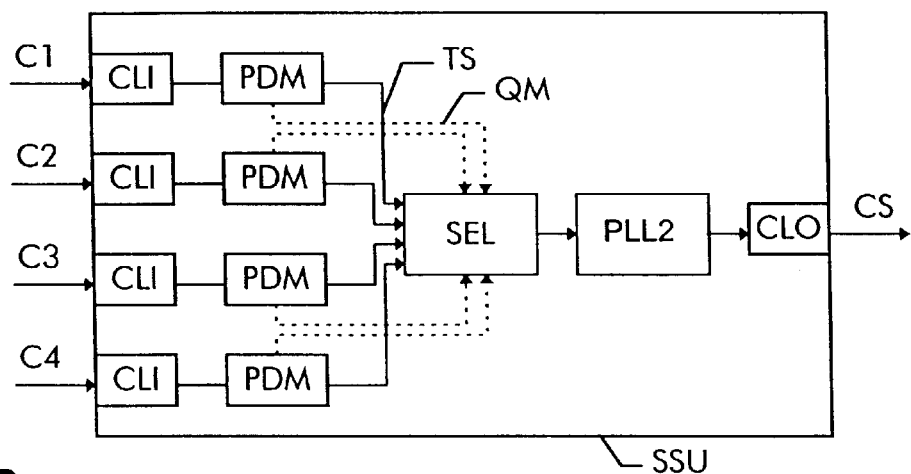
FIG. 2a shows a clock generator of a second embodiment.

The clock generator SSU of a second embodiment shown in FIG. 2a is designed for use in a network node containing several network elements. It includes a clock module PLL2 which, in the unsynchronized mode, delivers a clock signal with the stability G.812T. The clock module PLL2 is a phase-locked loop that meets the requirements of ITU-T Recommendation G.812T. The clock generator SSU has four inputs CLI for clock signals C1–C4 and one clock signal output CLO. Each of the clock signal inputs CLI is followed by a respective phase demodulator PDM. The received clock signals C1–C4 may have a phase modulation applied to them that is characteristic of the clock quality. The phase demodulators detect the phase modulation and derive therefrom the quality of the respective clock signals applied to them. Advantageously, the phase demodulators extract the phase modulation from the respective clock signal by low-pass filtering.

The phase demodulators PDM feed the clock signals TS and the quality information QM for each clock signal to a selection logic SEL. The connections for the quality information QM are shown as dashed arrows, and those for the clock signals TS as continuous arrows. The selection logic SEL selects one of the four clock signals TS based on the quality information QM, and feeds the selected clock signal to the clock module PLL2 to synchronize the latter. If none of the four clock signals has a quality better than or at least equal to the clock signal delivered by the clock module in the unsynchronized mode (here G.812T), none of the clock signals will be selected and the clock module will not be synchronized (so-called holdover mode). The output signal of the clock module PLL2 is made available at the clock output CLO as a reference clock signal CS for a connected network element or a network node.

Figure 2B:
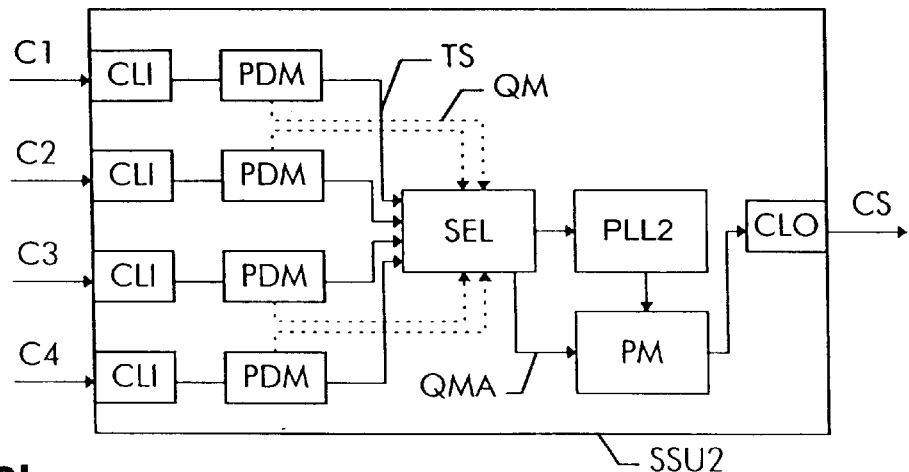
FIG. 2b shows a development of the clock generator of the second embodiment.

A development of the clock generator of FIG. 2a is shown in FIG. 2b, in which parts having similar functions as in FIG. 2a are designated by similar reference characters. The development consists in the fact that the output signal of the clock module PLL2 is fed to a phase modulator PM. From the selection logic, the phase modulator PM receives quality information QMA about the quality of the selected clock signal. Based on this quality information, the phase modulator applies a characteristic phase modulation to the output signal of the clock module PLL2. The phase-modulated output signal is provided as a reference clock signal CS at the clock signal output CLO. In this manner, connected network elements that use the reference clock signal for synchronization are informed of the quality of the reference clock signal CS via the applied phase modulation and can distribute this information, in the form of a synchronization status message in the overhead of the message signal to be transmitted, to other connected network elements.

Figure 3:
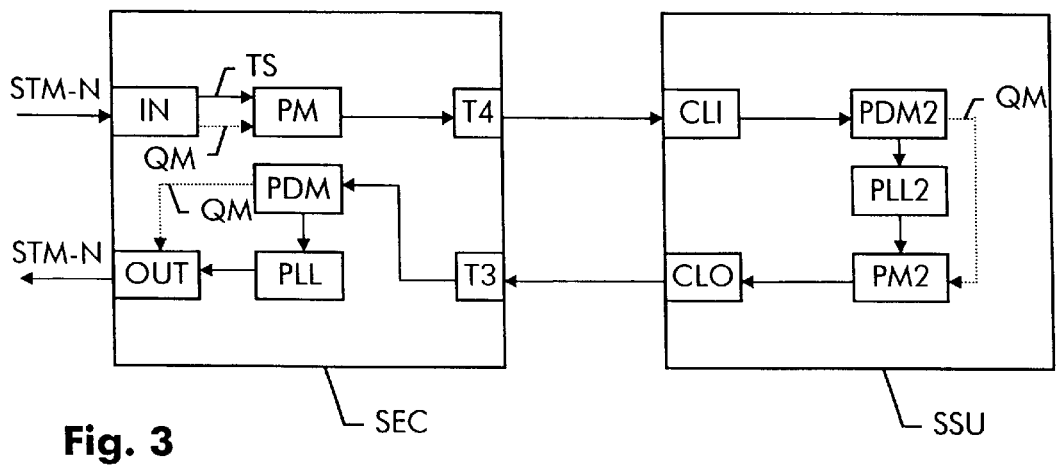
FIG. 3 illustrates the interplay between a clock generator according to the invention and a network element according to the invention in a third embodiment.

The interaction between a network element SEC according to the invention and a clock generator SSU according to the invention is illustrated in a third embodiment in FIG. 3, which shows only the modules necessary for the synchronization of the network element. The network element SEC receives a synchronous message signal STM-N at an interface IN. At the interface, a clock signal TS is derived from the message signal and fed to a phase modulator PM. In addition, the synchronization status message SSM contained in the message signal is analyzed at the interface to determine the quality of the clock signal. Quality information QM is sent to the phase modulator PM. The phase modulator applies to the clock signal TS a phase modulation characteristic of the clock quality and makes the phase-modulated clock signal available as an output signal at a clock interface T4.

The clock interface T4 of the network element SEC is connected to a clock interface CLI of the clock generator SSU. The clock generator contains a phase demodulator PDM2, a clock module PLL2, and a phase modulator PM2. In the unsynchronized mode (holderover mode), the clock module delivers a clock signal with the quality G.812T. The clock signal received at the clock interface CLI is fed to the phase demodulator PDM 2. The latter detects the phase modulation applied to the clock signal and derives quality information QM therefrom, which it feeds to the phase modulator. If the received clock signal has a quality better than or equal to the quality of the clock signal delivered by the clock module PLL2, it will be passed on to the clock module PLL2 and the latter will synchronize with the received clock signal. Otherwise, the clock module will change to the unsynchronized mode. The output of the clock module is applied to the phase modulator, which applies to the clock signal a phase modulation characteristic of the clock quality indicated by the quality information QM. The clock quality cannot be worse than G.812T, however. The phase-modulated clock signal is made available as a reference clock signal at a clock interface CLO.

The clock interface CLO of the clock generator SSU is connected to a further clock interface T3 for reference clock signals of the network element SEC. From there, the reference clock signal is fed to a phase demodulator PDM, which detects the phase modulation to determine the clock quality therefrom, and which feeds quality information QM to an output interface circuit OUT. The reference clock signal is fed from the phase demodulator PDM to a clock supply circuit PLL, which synchronizes with the reference clock signal. The output of the clock supply circuit PLL serves as an internal clock signal for the network element SEC and is fed to, inter alia, the output interface circuit OUT. Using the internal clock signal, the output interface circuit OUT forms synchronous message signals to be transmitted, STM-N. In the overhead of these message signals, a synchronization status message SSM is inserted, which contains information about the clock quality, and thus about the synchronization status of the network element SEC.

Figure 4:
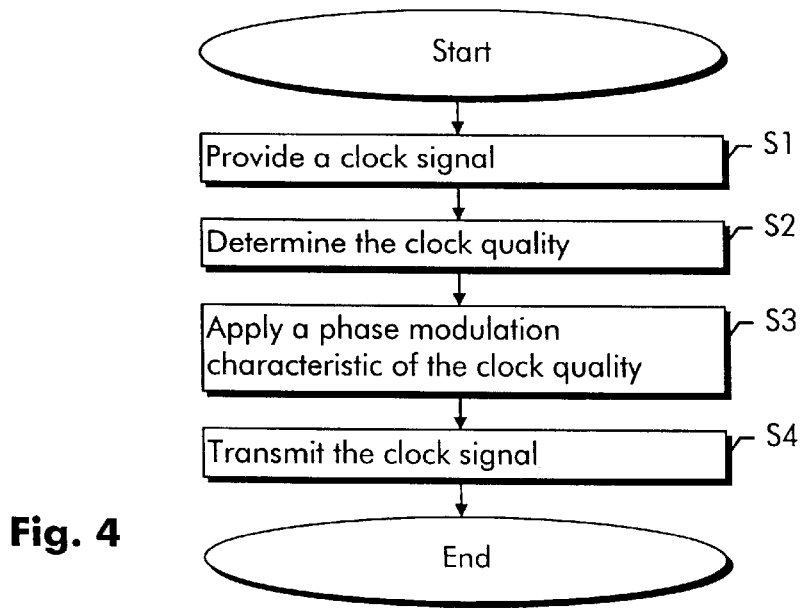
FIG. 4 is a flowchart for the transmission method according to the invention.

The method according to the invention for transmitting a clock signal in a digital synchronous communications network, illustrated in FIG. 4 in the form of a flowchart, comprises the following steps:

Step S1: A clock signal is provided, for example by a clock module, a GPS receiver, or a primary reference clock generator.

Step S2: The quality of the clock signal is determined based on, e.g., the origin of the clock signal or on a received synchronization status message if the clock signal was derived from a synchronous message signal.

Step S3: A phase modulation characteristic of the quality of the clock signal is applied to the clock signal. Advantageously, the phase modulation lies within the maximum permissible phase-variation limits for the communications network. The phase modulation may exhibit one of two or more periodic phase modulation patterns. For example, the better the clock quality, the greater the time distance between individual maximum phase modulation amplitudes (high/low) can be chosen.

Step S4: The phase-modulated clock signal is transmitted via a clock interface.

Instead of employing two or more phase modulation patterns, the clock quality can be signaled by using a phase modulation in the presence of poor clock quality (G.812 and worse), for example by modulating phase noise onto the clock signal, and no phase modulation in the presence of good clock quality (G.811) or vice versa.

Figure 5:
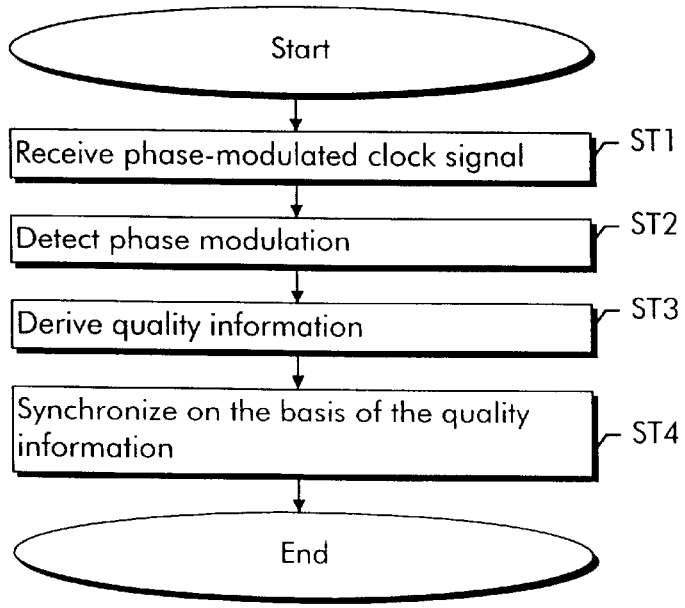
FIG. 5 is a flowchart for the synchronization method according to the invention.

FIG. 5 shows a flowchart of the method according to the invention for synchronizing clock generators or network elements of a synchronous digital communications network. It comprises the following steps:

Step ST1: A phase-modulated clock signal is received at a clock interface of the clock generator or the network element. The phase modulation is characteristic of the clock quality.

Step ST2: The phase modulation is detected, and advantageously extracted, by means of a phase demodulator.

Step ST3: From the detected phase modulation, quality information is derived.

Step ST4: Based on the quality information, a clock supply circuit of the network element or a clock module of the clock generator is synchronized. Synchronization takes place only if the clock quality is higher than or equal to the clock quality of the clock supply circuit or of the clock module in the unsynchronized mode.

In a preferred embodiment of the synchronization method according to the invention, several phase-modulated clock signals each having a phase modulation characteristic of its quality applied to it are received. Based on the phase modulations, one of the clock signals is then selected for synchronization.

From the embodiments described it is clear that the method according to the invention for transmitting clock signals in a communications system and for synchronizing network elements or clock generators has many applications. The signaling of the clock quality by phase modulation of the clock signal can be used between network elements of a network node, between a network element and a reference clock generator, and between a reference clock generator and a network element. It permits the clock quality to be signaled via simple clock interfaces, thus adding to the advantages offered by the introduction of the synchronization status message SSM in SDH and SONET systems. Thus, the method according to the invention is to be regarded not only as a substitute for the signaling of the clock quality by means of SSMs but also as a supplement, for example in cases where clock signals cannot be derived from message signals because only simple clock interfaces are available.

What is claimed is:

1. A method of transmitting a clock signal serving to synchronize a network element of a synchronous digital communications network, the clock signal being received from a clock source via a clock interface of the network element, said method comprising:

applying a phase modulation characteristic of the quality of the clock signal to the clock signal, wherein the phase modulation lies within the maximum permissible phase-variation limits for the synchronous digital communications network.

2. A method of transmitting a clock signal serving to synchronize a network element of a synchronous digital communications network, the clock signal being received from a clock source via a clock interface of the network element, said method comprising:

applying a phase modulation characteristic of the quality of the clock signal to the clock signal, wherein the phase modulation exhibits one of two or more periodic phase modulation patterns depending on the quality of the clock signal.

3. A method of synchronizing a network element of a synchronous digital communications network with a transmitted clock signal, said method comprises:

receiving a message signal at the network element from a neighboring network element, deriving a clock signal from the message signal, and analyzing a synchronization status message contained in the received message signal to determine the clock quality of the message signal, applying to the derived clock signal a phase modulation characteristic of the clock quality of the message signal, and transferring the phase-modulated clock signal through a clock output to a clock generator, receiving at the clock generator a respective phase-modulated clock signal from each of a number of network elements, evaluating the phase modulation to determine the respective clock quality therefrom, and selecting one of the received clock signals as a reference clock signal based on the clock quality, sending said reference clock signal to the number of network elements or to further network elements for synchronization, receiving at the network element said reference clock signal from the clock generator via a clock input of the network element, and synchronizing the network element with the reference clock signal.

4. A method of synchronizing a clock generator or a network element of a synchronous digital communications network wherein an external clock signal is received via a clock interface, said method comprises:

applying a phase modulation to the external clock signal prior to transmission to the clock generator or network element, the phase modulation characteristic of the quality of the external clock signal, wherein the phase modulation lies within the maximum permissible phase-variation limits for the synchronous digital communications network, detecting the phase modulation applied to the external clock signal and deriving quality information therefrom, and synchronizing the clock generator or the network element to the external clock signal based on the quality information derived from the phase modulation.

5. The method as claimed in claim 4, wherein two or more further clock signals are received which also have a phase modulation characteristic of their quality applied to them, said method further comprises selecting, based on the quality of the two or more further clock signals, one of the clock signals for synchronization.

6. A network element for a synchronous digital communications network, comprising:

a clock supply circuit for supplying the network element with an internal clock signal, a clock interface for receiving an external clock signal from a clock source, said external clock signal having a phase modulation applied thereto prior to transmission to the network element, said phase modulation characteristic of the quality of the external clock signal, wherein said phase modulation lies within the maximum permissible phase-variation limits for the synchronous digital communications network, and synchronizing circuitry synchronizing the clock supply circuit to the received external clock signal, said network element further comprising:

a phase modulation detector detecting said phase modulation applied to the external clock signal, said phase modulation being indicative of the quality of the external clock signal, wherein the synchronizing circuitry synchronizes the clock supply circuit to the external clock signal based on the quality of the external clock signal.

7. The network element as claimed in claim 6, further comprising a phase modulator applying a phase modulation indicative of the quality of the internal clock signal to clock signals to be transmitted.

8. A clock generator for distributing a clock signal to network elements of a synchronous digital communications network, comprising clock interfaces for connecting the network elements, said clock generator further comprising:

a detector determining the clock quality, and a modulator applying to the clock signal a phase modulation indicative of the quality of the clock signal.

9. The clock generator as claimed in claim 8, further comprising:

a clock module generating the clock signal, a clock interface receiving an external clock signal, a detector detecting a phase modulation applied to, and indicating the quality of, the external clock signal, and a clock synchronizer synchronizing the clock module to the external clock signal based on the quality of the external clock signal.

10. A network element for a synchronous digital communications network, comprising:

a clock supply circuit for supplying the network element with an internal clock signal, a clock interface for receiving an external clock signal from a clock source, said external clock signal having a phase modulation applied thereto prior to transmission to the network element, said phase modulation characteristic of the quality of the external clock signal, wherein said phase modulation lies within the maximum permissible phase-variation limits for the synchronous digital communications network, and means for synchronizing the clock supply circuit to the received external clock signal, said network element further comprising:

means for detecting said phase modulation applied to the external clock signal, said phase modulation being indicative of the quality of the external clock signal, wherein the means for synchronizing synchronizes the clock supply circuit to the external clock signal based on the quality of the external clock signal.

11. The network element as claimed in claim 10, further comprising means for applying a phase modulation indicative of the quality of the internal clock signal to clock signals to be transmitted.

12. A clock generator for distributing a clock signal to network elements of a synchronous digital communications network, comprising clock interfaces for connecting the network elements, said clock generator further comprising:
   means for determining the clock quality, and
   means for applying to the clock signal a phase modulation indicative of the quality of the clock signal.

13. A clock generator as claimed in claim 12, further comprising:
   a clock module generating the clock signal,
   a clock interface receiving an external clock signal,
   means for detecting a phase modulation applied to, and indicating the quality of, the external clock signal, and
   means for synchronizing the clock module to the external clock signal based on the quality of the external clock signal.

14. A method of synchronizing a clock generator or a network element of a synchronous digital communications network wherein an external clock signal is received via a clock interface, said method comprises:
   applying a phase modulation to the external clock signal prior to transmission to the clock generator or network element, the phase modulation characteristic of the quality of the external clock signal, wherein the phase modulation exhibits one of two or more periodic phase modulation patterns depending on the quality of the external clock signal,
   detecting the phase modulation applied to the external clock signal and deriving quality information therefrom, and
   synchronizing the clock generator or the network element to the external clock signal based on the quality information derived from the phase modulation.

15. The method as claimed in claim 14, wherein two or more external clock signals are received which also have a phase modulation characteristic of their quality applied to them, said method further comprises selecting, based on the quality of the two or more external clock signals, one of the external clock signals for synchronization.

16. A network element for a synchronous digital communications network, comprising:

a clock supply circuit for supplying the network element with an internal clock signal, a clock interface for receiving an external clock signal from a clock source, said external clock signal having a phase modulation applied thereto prior to transmission to the network element, said phase modulation characteristic of the quality of the external clock signal, wherein said phase modulation exhibits one of two or more periodic phase modulation patterns depending on the quality of the external clock signal, and synchronizing circuitry synchronizing the clock supply circuit to the received external clock signal, said network element further comprising:
   a phase modulation detector detecting said phase modulation applied to the external clock signal, said phase modulation being indicative of the quality of the external clock signal, wherein the synchronizing circuitry synchronizes the clock supply circuit to the external clock signal based on the quality of the external clock signal.

17. The network element as claimed in claim 16, further comprising a phase modulator applying a phase modulation indicative of the quality of the internal clock signal to clock signals to be transmitted.

18. A network element for a synchronous digital communications network, comprising:
   a clock supply circuit for supplying the network element with an internal clock signal,
   a clock interface for receiving an external clock signal from a clock source, said external clock signal having a phase modulation applied thereto prior to transmission to the network element, said phase modulation characteristic of the quality of the external clock signal, wherein said phase modulation lies within the maximum permissible phase-variation limits for the synchronous digital communications network, and
   means for synchronizing the clock supply circuit to the received external clock signal, said network element further comprising:
      means for detecting said phase modulation applied to the external clock signal, said phase modulation being indicative of the quality of the external clock signal, wherein the means for synchronizing synchronizes the clock supply circuit to the external clock signal based on the quality of the external clock signal.

19. The network element as claimed in claim 18, further comprising means for applying a phase modulation indicative of the quality of the internal clock signal to clock signals to be transmitted.

* * * * *